United States Patent [19]

Earley

[11] Patent Number: 5,159,056
[45] Date of Patent: Oct. 27, 1992

[54] PREPARATION OF ARYLENE SULFIDE POLYMER IN THE PRESENCE OF TITANIUM DIOXIDE

[75] Inventor: George A. Earley, Bartlesville, Okla.

[73] Assignee: Phillips Petroleum Company, Bartlesville, Okla.

[21] Appl. No.: 625,382

[22] Filed: Dec. 11, 1990

[51] Int. Cl.$^5$ .............................................. C08G 75/16
[52] U.S. Cl. .................................. 528/388; 524/609; 528/387
[58] Field of Search ................. 528/388, 387; 524/609

[56] References Cited

U.S. PATENT DOCUMENTS

| | | | |
|---|---|---|---|
| 3,354,129 | 11/1967 | Edmonds, Jr. et al. | 260/79 |
| 3,622,376 | 11/1971 | Tieszen et al. | 117/132 B |
| 3,800,845 | 4/1974 | Scoggin | 159/47 |
| 3,919,177 | 11/1975 | Campbell | 260/79.1 |
| 3,928,675 | 12/1975 | Tieszen | 427/257 |
| 4,415,729 | 11/1983 | Scoggins | 528/388 |
| 4,448,918 | 5/1984 | Leland | 524/262 |

Primary Examiner—Harold D. Anderson
Attorney, Agent, or Firm—Richmond, Phillips, Hitchcock & Carver

[57] ABSTRACT

A process for preparing arylene sulfide polymers by contacting a sulfur source, a cyclic organic amide, and a dihaloaromatic compound to form a polymerization mixture, polymerizing the polymerization mixture and recovering the arylene sulfide polymer wherein the process is conducted in the presence of titanium dioxide.

15 Claims, No Drawings

PREPARATION OF ARYLENE SULFIDE POLYMER IN THE PRESENCE OF TITANIUM DIOXIDE

BACKGROUND OF THE INVENTION

This invention relates to the production of arylene sulfide polymers. In one aspect, this invention relates to the production of phenylene sulfide polymers. In another aspect, this invention relates to the production of lighter colored arylene sulfide polymers.

Flexibility in the use of color in fiber and/or mineral reinforced thermoplastic compounds having good mechanical, chemical, thermal and electrical properties is particularly desirable. In applications where such flexibility is desired, a major problem is the preparation of thermoplastic polymers having a consistent degree of whiteness. Failure to attain a consistent degree of whiteness in the polymer results in problems in formulating color compounds that consistently give the desired color.

Arylene sulfide polymers are thermoplastic polymers known in the art, and processes for making these polymers are disclosed in various U.S. patents including, but not limited to, U.S. Pat. Nos. 3,354,129 and 3,919,177. Although these patents represent significant and valuable advances in the art, there is need for a simplified process which can provide arylene sulfide polymers having a consistent degree of whiteness.

A simplified process for achieving consistent whiteness in arylene sulfide polymers has now been discovered. The discovery that titanium dioxide could be added directly during the polymerization of arylene sulfide polymers to achieve consistent color was completely unexpected even though titanium dioxide is known in the art as a pigment and as an additive in arylene sulfide polymer compositions.

SUMMARY OF THE INVENTION

It is an object of the invention to provide a process for producing arylene sulfide polymer having lighter color, i.e. having an improved whiteness color value. It is a further object of the invention to provide a process for producing arylene sulfide polymer having a consistent color, i.e. having a consistent whiteness color value.

According to the invention, a process for preparing arylene sulfide polymers is provided which comprises contacting at least one sulfur source, at least one cyclic organic amide and at least one dihaloaromatic compound to form a polymerization mixture, subjecting the polymerization mixture to polymerization conditions of temperature and time sufficient to form the arylene sulfide polymer, and recovering the arylene sulfide polymer, wherein the process is conducted in the presence of titanium dioxide. In a further embodiment, the titanium dioxide may be added to the polymerization mixture prior to subjecting the polymerization mixture to polymerization conditions, or during the time the polymerization mixture is being subjected to polymerization conditions.

DETAILED DESCRIPTION OF THE INVENTION

This invention relates to a process for preparing arylene sulfide polymers having a consistent degree of whiteness comprising the steps of: (a) contacting at least one sulfur source, at least one cyclic organic amide and at least one dihaloaromatic compound to form a polymerization mixture, (b) subjecting the polymerization mixture to polymerization conditions of temperature and time sufficient to form the arylene sulfide polymer, and (c) recovering the arylene sulfide polymer, wherein the process is conducted in the presence of titanium dioxide. The arylene sulfide polymers having a consistent degree of whiteness made according to this invention are readily recoverable and well suited for use in applications where such arylene sulfide polymers are desired, e.g. fiber and/or mineral reinforced color compounds. The degree of whiteness of arylene sulfide polymers can be readily determined by use of a colorimeter such as a Hunter Associates Laboratory, Inc. Hunterlab Tristimulus Colorimeter Model D25M-9.

The titanium dioxide employed in the process of the invention is present in an amount sufficient to produce arylene sulfide polymer having lighter color. Specifically, the amount of titanium dioxide employed according to the process of the invention can be conveniently expressed in terms of a molar ratio based on the sulfur source compound. Broadly, the molar ratio of titanium dioxide to sulfur source compound will be about 0.003:1 to about 0.1:1, preferably about 0.005:1 to about 0.05:1, and most preferably about 0.007:1 to about 0.015:1. The titanium dioxide will be effective in the process of the invention when added to the polymerization mixture prior to subjecting the polymerization mixture to polymerization conditions, or during the time the polymerization mixture is being subjected to polymerization conditions.

The dihaloaromatic compounds which are employed according to the invention are compounds having 6 to about 22 carbon atoms per molecule. The halogen substituent on the dihaloaromatic compound can be selected from the group consisting of chlorine, bromine, and iodine. Preferably, the dihaloaromatic compound will be dihalo-substituted benzene and more preferably dichloro-substituted benzene. Particularly good results are expected when the dihaloaromatic compound is selected from the group consisting of p-dichlorobenzene and mixtures of p-dichlorobenzene with a total of about 0 to about 10 mole percent of at least one of m-dichlorobenzene, o-dichlorobenzene, and alkyl-substituted dichlorobenzene having the formula

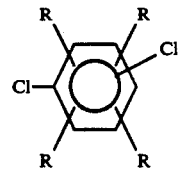

wherein R is hydrogen or an alkyl group having 1 to about 4 carbon atoms and at least one R is not hydrogen.

Examples of some suitable dihaloaromatic compounds include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1,2,4,5-tetrabutyl-3,6-dichlorobenzene, 1-ethyl-3-butyl-2,5-dichlorobenzene, 1-ethyl-2,5-diiodobenzene, 1-butyl-2,5-dichlorobenzene, 1-butyl-4-ethyl-2,5-dibromobenzene, o-dichlorobenzene, m- dichlorobenzene and the like, and mixtures of any two or more thereof. The presently preferred dihaloaromatic compound is p-dichlorobenzene because of its effectiveness and commercial availability.

The cyclic organic amide used in the process of the invention should be substantially liquid at the reaction temperatures and pressures employed. The cyclic organic amides can have 5 to about 12 carbon atoms per molecule. Examples of some suitable cyclic organic amides include N,N'-ethylenedipyrrolidone, N-methyl-2-pyrrolidone, pyrrolidone, caprolactam, N-ethylcaprolactam, N-methylcaprolactam and mixtures thereof. The presently preferred cyclic organic amide is N-methyl-2-pyrrolidone because of its effectiveness and commercial availability. The amount of cyclic organic amide employed according to the process of the invention can be expressed in terms of a molar ratio of cyclic organic amide to sulfur source compound. Broadly, the molar ratio of cyclic organic amide to sulfur source compound will be about 1.5:1 to about 25:1, preferably about 2:1 to about 8:1.

In accordance with the invention, suitable sulfur sources which can be employed in the production of the arylene sulfide polymers include alkali metal sulfides, alkali metal bisulfides, N-methyl-2-pyrrolidinethione, and hydrogen sulfide. Further according to the invention, the alkali metal sulfides can be employed with good results in the absence of any added alkali metal hydroxide whereas the other suitable sulfur sources are preferably employed in the process of the invention in the presence of an added alkali metal hydroxide. For the alkali metal bisulfides and N-methyl-2-pyrrolidinethione, the amount of added alkali metal hydroxide will generally be in the range of from about 0.3:1 to about 4:1, preferably about 0.4:1 to about 2:1 moles per mole of alkali metal bisulfide or N-methyl-2-pyrrolidinethione. When hydrogen sulfide is employed as the sulfur source, the amount of added alkali metal hydroxide is generally within the range of about 1.3:1 to about 5:1, preferably about 1.4:1 to about 3:1 moles per mole of hydrogen sulfide employed.

Alkali metal hydroxides that can be employed according to the invention include lithium hydroxide, sodium hydroxide, potassium hydroxide, rubidium hydroxide, cesium hydroxide, and mixtures thereof. Sodium hydroxide is preferred because of ready availability and good results obtained using this compound. The alkali metal hydroxide can conveniently be utilized in the process of the invention as an aqueous solution. For example, an aqueous solution of sodium hydroxide having about 50 wt. % sodium hydroxide is convenient to use.

Alkali metal bisulfides that can be employed according to the invention include lithium bisulfide, sodium bisulfide, potassium bisulfide, rubidium bisulfide, cesium bisulfide, and mixtures thereof. Sodium bisulfide is preferred because of ready availability and good results obtained therewith. The alkali metal bisulfide can conveniently be utilized in the process of the invention as an aqueous solution. For example, an aqueous solution of sodium bisulfide having about 60 wt. % sodium bisulfide is convenient to use.

Alkali metal sulfides which can be employed in the process of the invention include lithium sulfide, sodium solfide, potassium sulfide, rubidium sulfide, cesium sulfide, and mixtures thereof. The alkali metal sulfide can be used in anhydrous form, as a hydrate, or as an aqueous mixture. Sodium sulfide is preferred because of ready availability and good results obtained therewith.

While the ratio of reactants for the preparation of arylene sulfide polymers according to the invention can vary considerably, the ratio of moles of dihaloaromatic compound to atoms of divalent sulfur in the sulfur source should be within the range of about 0.8:1 to about 2:1, preferably about 0.95:1 to about 1.3:1.

In another embodiment of the invention, alkali metal carboxylates can be employed in the process of the invention. The alkali metal carboxylates that can be employed in the process of the invention can be represented by the formula $R'CO_2M$ where $R'$ is a hydrocarbyl radical selected from alkyl, cycloalkyl, and aryl and combinations thereof such as alkaryl, aralkyl, and the like, the number of carbon atoms in said $R'$ being within the range of 1 to about 20, and M is an alkali metal selected from lithium, sodium, potassium, rubidium, and cesium.

Examples of some alkali metal carboxylates that can be employed in the process of the invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octadecanoate, sodium heneicosanoate, lithium cyclohexane carboxylate, cesium cyclododecane carboxylate, sodium 3-methylcyclopentane carboxylate, potassium cyclohexylacetate, potassium benzoate, lithium benzoate, sodium benzoate, potassium m-toluate, lithium phenyl acetate, sodium 4-phenylcyclohexane carboxylate, potassium p-tolylacetate, lithium 4-ethylcyclohexylacetate and the like and mixtures thereof. The presently preferred alkali metal carboxylate is sodium acetate because of its effectiveness, economics and commercial availability.

The amount of alkali metal carboxylate employed according to the invention can be expressed in terms of molar ratio based on the sulfur source compound employed. Broadly, the molar ratio of alkali metal carboxylate to sulfur source compound will be from about 0.002:1 to about 4:1, preferably about 0.1:1 to about 2:1.

In a further embodiment of the invention, polyhaloaromatic compounds can be employed in the process of the invention as a component in the polymerization step. The amount of polyhaloaromatic compound which may be employed can be conveniently expressed in terms of a molar ratio based on the sulfur source compound employed. Broadly, the molar ratio of polyhaloaromatic compound to sulfur source will be about 0.001:1 to about 0.02:1, preferably about 0.002:1 to about 0.01:1, and most preferably about 0.004:1 to about 0.008:1.

Polyhaloaromatic compounds that can be employed in the process of the invention can be represented by the formula

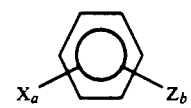

wherein X is a halogen selected from the group consisting of fluorine, chlorine, bromine and iodine, a is 3 or 4 and a+b is 6. When a is 3, each Z is preferably hydrogen. When a is 4, Z can be hydrogen, or any of a variety of substituents including, but not limited to, alkyl radicals having 1 to about 4 carbon atoms, —NH$_2$ and —OR" wherein R" is an alkyl radical having 1 to about 4 carbons atoms.

Examples of suitable polyhaloaromatic compounds that can be employed in the process of the invention include 1,2,3-trichlorobenzene, 1,2,4-trichlorobenzene, 1,3,5-trichlorobenzene, 1,2,3-trifluorobenzene, 1,2,4-trifluorobenzene, 1,3,5-trifluorobenzene, 1,2,3,4-tetrachlorobenzene, 1,2,4,5-tetrachlorobenzene, 1,2,3,5-tetrachlorobenzene, 1,2,3,4-tetrafluorobenzene, 1,2,4,5-tetrafluorobenzene, 1,2,3,5-tetrafluorobenzene, 1,3-dichloro-4-fluorobenzene, 1,3-dichloro-2-fluorobenzene, 2,3,4,5-tetrachloroaniline, 2,3,5,6-tetrachloroaniline, 2,3,4,5-tetrachlorotoluene, 2,3,4,6-tetrachlorotoluene, 2,3,5,6-tetrachlorotoluene, 1-methoxy-2,3,5,6-tetrachlorobenzene, 2-methoxy-1,3,4,5-tetrachlorobenzene, 1-methoxy-2,3,5-trichlorobenzene, and the like, and mixtures of any two or more thereof. The presently preferred polyhaloaromatic compound is 1,2,4-trichlorobenzene because of its effectiveness, economics and commercial availability.

Suitable polymerization conditions include a reaction temperature which can vary over a wide range but will generally be within the range of about 200° C. to about 450° C., preferably from about 210° C. to about 350° C. The reaction time will be within the range of about 10 minutes to about 72 hours and preferably about 1 hour to about 8 hours. The pressure need be only sufficient to maintain the dihaloaromatic compound and the cyclic organic amide substantially in the liquid phase, and to substantially retain the sulfur source therein.

Although various known methods can be employed for the recovery of the arylene sulfide polymers made according to the invention, it is preferred to employ a method, such as the one described in U.S. Pat. No. 3,800,845, wherein the heated polymerization mixture is subjected to an isothermal evaporation reducing the pressure on the polymerization mixture from reaction pressure sufficiently to evaporate essentially all of the water and approximately ⅓ of the cyclic organic amide and then removing the concentrated polymerization mixture to another vessel flashing the mixture adiabatically to about atmospheric pressure to remove essentially all the cyclic organic amide from the arylene sulfide polymer. The flashed reaction mixture residue can be slurried with a liquid diluent such as water in which the alkali metal halides and other impurities are soluble. The liquid diluent is removed with dissolved impurities such as by filtration leaving a particular arylene sulfide polymer. This washing process can be repeated until the desired level of arylene sulfide polymer purity is attained. Another known method that can be employed is the "water quench" process described in U.S. Pat. No. 4,415,729, wherein the polymerization mixture is contacted at a temperature above that at which the arylene sulfide polymer is soluble in the polymerization mixture with a sufficient amount of a separation agent that is soluble in the cyclic organic amide and is a non-solvent for the arylene sulfide polymer, e.g. water, to cause or enhance a phase separation. Subsequent cooling of the quenched, phase-separated mixture produces a slurry of particulate arylene sulfide polymer in the cyclic organic amide which can be filtered to recover the particulate arylene sulfide polymer. The separated polymer can be washed as described above.

The arylene sulfide polymers produced by the process of the invention can be blended with fillers, fibers, pigments, extenders, other polymers and the like. The arylene sulfide polymers can be cured to provide cured products having high thermal stability and good chemical resistance, wherein curing is defined as a distinct process step after polymer drying comprising a thermal treatment on the polymer in the presence of an oxygen-containing atmosphere. The preferred oxygen-containing atmosphere is air. The arylene sulfide polymers of the invention are useful in the production of film, fibers, molded objects, and composites and is particularly useful in molded objects produced from fiber and/or mineral reinforced colored compounds.

EXAMPLES

Example 1

This is a control example detailing a polymerization of PPS which is not conducted in the presence of titanium dioxide.

Using a polymerization technique such as that detailed in U.S. Pat. No. 3,919,177 and a recovery technique similar to that detailed in U.S. Pat. No. 3,800,845, an approximately 100 lb. theoretical yield batch size PPS polymerization was made as follows.

Aqueous sodium hydroxide (73.2 lb. of approximately 49.8 wt. % NaOH), 88.2 lb. of an aqueous sodium bisulfide (NaSH) solution tested to be approximately 58.8 wt. % NaSH and 0.3 wt. % Na$_2$S, and 15 lbs. sodium acetate were combined with approximately 12 gallons of N-methyl-2-pyrrolidone (NMP) and the mixture was dehydrated over a period of 76 minutes by heating the mixture to 419° F. and collecting 70.1 lbs. overhead. The dehydrated mixture was combined with 140.5 lbs. of p-dichlorobenzene (DCB) and 21.8 gallons of NMP. The resulting mixture, initially at 414° F., was stirred and heated to approximately 437° F. at approximately 1.8° F. per minute, then heated to approximately 482° F. at approximately 1.2° F. per minute and finally heated to approximately 540° F. at 2.25° F. per minute, at which temperature it was held, with stirring, for approximately 65 minutes. At the end of the hold time, a sample of the reactor contents was taken for analysis, and the polymer recovered using the "flash" technique disclosed in the above-cited patent. The sample taken for analysis was washed with 1000 mL deionized water at ambient temperature, washed twice with 1000 mL portions of deionized water at 194° F. and then dried in a vacuum oven at 284° F.

The sample taken for analysis, washed and dried as indicated above, is hereinafter referred to as Sample 1 and was tested for whiteness using a Hunter Associates Laboratory, Inc. Hunterlab Tristimulus Colorimeter Model D25M-9. The results are given in Table 1.

Example 2

A second PPS polymerization, sampling, washing and drying was conducted essentially as in Example 1 with the exception that 450 grams of titanium dioxide (0.013:1 TiO$_2$: S=molar ratio) was included with the sodium acetate charged. The washed and dried sample, hereinafter referred to as Sample 2, was tested for whiteness as in Example 1, with the results shown in Table 1.

TABLE 1

| | Whiteness Test Results[a] | | |
|---|---|---|---|
| | L | a | b |
| Sample 1 | 80.11 | 0.73 | 6.44 |

TABLE 1-continued

| | Whiteness Test Results[a] | | |
|---|---|---|---|
| | L | a | b |
| Sample 2 | 88.50 | −0.21 | 5.90 |

[a]The "L" value is an indication of whiteness, with L = 100 being pure white and L = 0 being pure black. The "a" value is an indication of the relative redness or greenness of the sample, with a = 0 indicating no contribution from either red or green. minus "a" values indicating green contribution and plus "a" values indicating red contribution. The "b" value is an indication of the relative blueness or yellowness of the sample, with b = 0 incidating no contribution from either blue or yellow, minus "b" values indicating blue contribution and plus "b" values indicating yellow contribution.

The test results shown in Table 1 indicate that Sample 2, made using titanium dioxide, is significantly whiter than is Sample 1, made without using titanium dioxide, since the L value for Sample 2 is distinctly higher than that of Sample 1. Also, the fact that the a and b values for Sample 2 are smaller in magnitude than are the corresponding values for Sample 1 indicates that Sample 2, made using titanium dioxide, has less deviation from the pure white-to-pure black color line than does Sample 1, made without using titanium dioxide (i.e. Sample 2 has less "color" than does Sample 1, as well as being "whiter" than Sample 1). These test results are consistent with subjective visual inspection of these two samples.

Example 3

A third PPS polymerization was conducted essentially as in Example 2, including the addition of 450 grams of titanium dioxide (0.013:1 TiO$_2$:S=molar ratio) with the sodium acetate, but with polymer recovery being effected by a technique similar to that detailed in U.S. Pat. No. 4,415,729. The recovered polymer, hereinafter referred to as Sample 3, was tested for whiteness as in Example 1, with the results being given in Table 2. Sample 3 was also analyzed for titanium content, with the result shown in Table 2.

Example 4

A fourth PPS polymerization was conducted essentially as in Example 3 except that the amount of titanium dioxide charged was 250 grams (0.0074:1 TiO$_2$:S=molar ratio). The recovered polymer, hereinafter referred to as Sample 4, was tested for whiteness as in Example 1, with the results being given in Table 2.

Example 5

A fifth PPS polymerization was conducted essentially as in Example 3 except that the amount of titanium dioxide charged was 375 grams (0.011:1 TiO$_2$:S=molar ratio). The recovered polymer, hereinafter referred to as Sample 5, was tested for whiteness as in Example 1, with the results being given in Table 2. Sample 5 was also analyzed for titanium content, with the result shown in Table 2.

Example 6

This is a control in which a sixth PPS polymerization was conducted essentially as in Examples 3, 4 and 5 except that no titanium dioxide was charged. The recovered polymer, hereinafter referred to as Sample 6, was tested for whiteness as in Example 1, with the results being given in Table 2.

TABLE 2

| | L | a | b | Ti, ppm[a] |
|---|---|---|---|---|
| Sample 3 | 89.1 | −0.8 | 5.4 | 40.4 |
| Sample 4 | 88.7 | −0.1 | 6.7 | not tested |
| Sample 5 | 77.0 | −0.4 | 6.4 | 129.6 |
| Sample 6 | 84.2 | −0.4 | 5.0 | not tested |

[a]Titanium analysis was done by Inductively Coupled Plasma-Mass Spectrometry (ICP-MS) using a VG Elemental Model PQ1.

The test results shown in Table 2 indicate that Samples 3 and 4, made using titanium dioxide, are significantly whiter than control Sample 6, made without titanium dioxide, since the L values for Samples 3 and 4 are distinctly higher than that of Sample 6. It is unclear why the L value for Sample 5, made using titanium dioxide, is lower than that of Sample 6 particularly since it is clear that titanium dioxide was incorporated into the polymer as evidenced by a comparison of the Ti analysis for Samples 3 and 5.

That which is claimed is:

1. A process for preparing arylene sulfide polymers comprising the steps of:
   (a) contacting at least one sulfur source, at least one cyclic organic amide, and at least one dihaloaromatic compound to form a polymerization mixture,
   (b) subjecting said polymerization mixture to polymerization conditions of temperature and time sufficient to form said arylene sulfide polymer, and
   (c) recovering said arylene sulfide polymer, wherein said arylene sulfide polymer is prepared in the presence of an amount of titanium dioxide sufficient to lighten the color of said arylene sulfide polymer.

2. A process for preparing arylene sulfide polymers comprising the steps of:
   (a) contacting at least one sulfur source, at least one cyclic organic amide, and at least one dihaloaromatic compound to form a polymerization mixture,
   (b) subjecting said polymerization mixture to polymerization conditions of temperature and time sufficient to form said arylene sulfide polymer, and
   (c) recovering said arylene sulfide polymer, in the presence of titanium dioxide and wherein the molar ratio of said titanium dioxide to said sulfur source is about 0.003:1 to about 0.1:1.

3. A process according to claim 2 wherein said titanium dioxide is added to said polymerization mixture prior to subjecting said polymerization mixture to polymerization conditions.

4. A process according to claim 2 wherein said titanium dioxide is added during the time said polymerization mixture is being subjected to polymerization conditions.

5. A process according to claim 3 wherein said sulfur source is selected from the group consisting of alkali metal sulfides, alkali metal bisulfides, N-methyl-2-pyrrolidinethione and hydrogen sulfide.

6. A process according to claim 5 wherein said polymerization mixture further comprises an alkali metal hydroxide.

7. A process according to claim 6 wherein said cyclic organic amide comprises N-methyl-2-pyrrolidone and wherein said dihaloaromatic compound is selected from the group consisting of p-dichlorobenzene, and mixtures of p-dichlorobenzene with a total of about 0 to about 10 mole percent of at least one of m-dichlorobenzene, o-dichlorobenzene, and alkyl-substituted dichlorobenzene having the formula

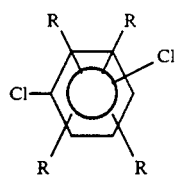

wherein R is hydrogen or an alkyl group of 1 to about 4 carbon atoms and at least one R is not hydrogen.

8. A process according to claim 7 wherein said alkali metal bisulfide comprises sodium bisulfide, said alkali metal hydroxide comprises sodium hydroxide, and said dihaloaromatic compound comprises p-dichlorobenzene.

9. A process according to claim 4 wherein said sulfur source is selected from the group consisting of alkali metal sulfides, alkali metal bisulfides, N-methyl-2-pyrrolidinethione and hydrogen sulfide.

10. A process according to claim 9 wherein said aqueous mixture further comprises an alkali metal hydroxide.

11. A process according to claim 10 wherein said cyclic organic amide comprises N-methyl-2-pyrrolidone and wherein said dihaloaromatic compound is selected from the group consisting of p-dichlorobenzene, and mixtures of p-dichlorobenzene with a total of about 0 to about 10 mole percent of at least one of m-dichlorobenzene, o-dichlorobenzene, and alkyl-substituted dichlorobenzene having the formula

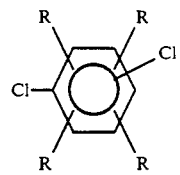

wherein R is hydrogen or an alkyl group of 1 to about 4 carbon atoms and at least one R is not hydrogen.

12. A process according to claim 11 wherein said alkali metal bisulfide comprises sodium bisulfide, said alkali metal hydroxide comprises sodium hydroxide, and said dihaloaromatic compound comprises p-dichlorobenzene.

13. A process according to claim 1 wherein said polymerization mixture further comprises an alkali metal carboxylate.

14. A process according to claim 1 wherein said polymerization mixture further comprises a polyhaloaromatic compound.

15. A process for preparing poly(phenylene sulfide) comprising the steps of:
(a) dehydrating an aqueous mixture comprising sodium bisulfide, sodium hydroxide, sodium acetate and N-methyl-2-pyrrolidone thereby forming a dehydrated mixture,
(b) contacting p-dichlorobenzene with said dehydrated mixture to produce a polymerization source,
(c) subjecting said polymerization mixture to polymerization conditions of temperature and time sufficient to form said poly(phenylene sulfide), and
(d) recovering said poly(phenylene sulfide), wherein said poly(phenylene sulfide) is prepared in the presence of titanium dioxide and the molar ratio of said titanium dioxide to said sodium bisulfide is about 0.007:1 to about 0.015:1.

* * * * *

UNITED STATES PATENT AND TRADEMARK OFFICE
CERTIFICATE OF CORRECTION

PATENT NO. : 5,159,056
DATED : October 27, 1992
INVENTOR(S) : George A. Earley

It is certified that error appears in the above-identified patent and that said Letters Patent is hereby corrected as shown below:

On title page, item [54] "POLYMER" should read --POLYMERS--

Col. 8, claim 2, line 42, after "polymer" and before "in", insert --- wherein said process is conducted ---.

Signed and Sealed this

Twelfth Day of April, 1994

*Attest:*

BRUCE LEHMAN

*Attesting Officer*

Commissioner of Patents and Trademarks